July 14, 1953 L. J. ANDERSON ET AL 2,645,683
ELECTROMECHANICAL TRANSDUCER
Filed Dec. 17, 1949
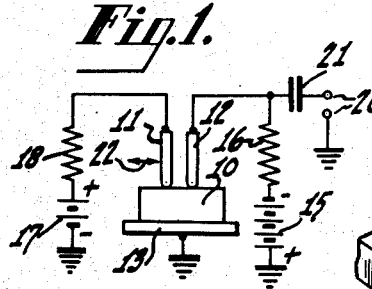
Fig. 1.
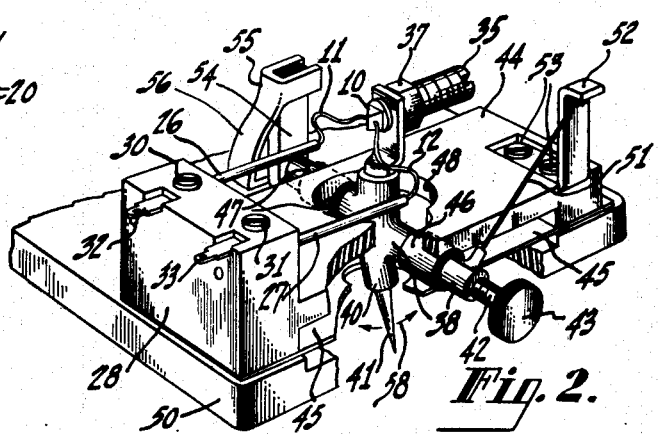
Fig. 2.
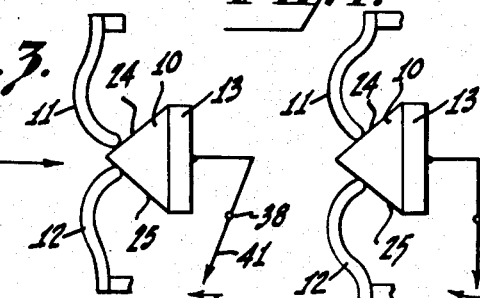
Fig. 3. Fig. 4. Fig. 5.
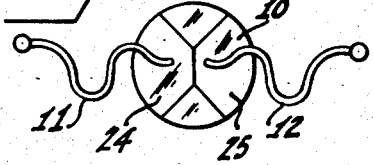
Fig. 6.
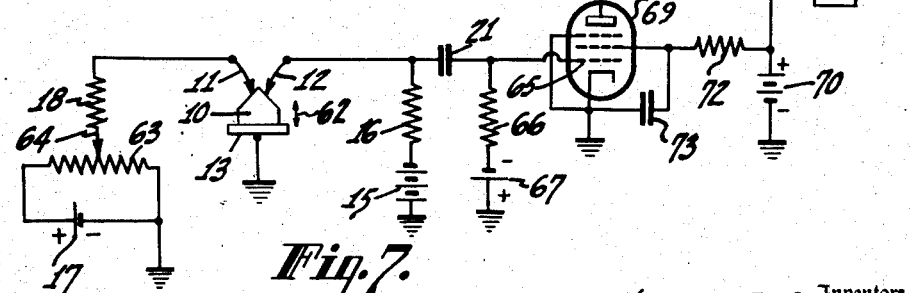
Fig. 7.
Inventors
LESLIE J. ANDERSON
& ROBERT K. DUNCAN
Attorney Patented July 14, 1953

2,645,683

UNITED STATES PATENT OFFICE 2,645,683

ELECTROMECHANICAL TRANSDUCER

Leslie J. Anderson, Moorestown, N. J., and Robert K. Duncan, Woodburn, Ind., assignors to Radio Corporation of America, a corporation of Delaware Application December 17, 1949, Serial No. 133,572

14 Claims. (Cl. 179—100.41)

This invention relates generally to electromechanical transducers, and particularly relates to a transducer having a movable vibratile element and a fixed transducing element.

As is well known, a semi-conductor amplifier may consist of a semi-conducting crystal such as, for example, a germanium crystal having a base electrode, an emitter electrode and a collector electrode in contact with the crystal. Such a semi-conductor amplifier has been termed a transistor. The base electrode is usually a large-area electrode in non-rectifying contact with the crystal. The emitter and collector electrodes make high-resistance, rectifying contacts with the crystal and usually consist of wires having a pointed end in contact with the crystal. It is well known that the current or voltage gain of such a semi-conductor amplifier is a function of the distance between the emitter and collector electrodes. Thus, the gain increases when the distance between the two rectifying electrodes decreases. Consequently, the output current becomes greater as the distance between the emitter and collector electrodes decreases.

In accordance with the present invention, the distance between the emitter and collector electrodes is varied in response to an external vibratory force applied thereto mechanically in such a manner as to obtain a high signal output. Thus, by way of example, the distance between the two rectifying electrodes, that is, the emitter and collector electrodes of a semi-conductor amplifier may be varied by the stylus of a phonograph pick-up or by the diaphragm of a microphone in order to obtain an electro-mechanical transducer.

It is accordingly an object of the present invention to provide a novel electro-mechanical transducer having a semi-conductor device as the transducing element thereof.

A further object of the invention is to provide a mechanically modulated semi-conductor amplifier wherein the distance between the emitter and collector electrodes may be varied at any desired rate to vary the gain and to produce an output signal, as by the vibratile movement of an element such as the stylus of a phonograph pick-up device or the diaphragm of a microphone.

Another object of the invention is to provide a novel electro-mechanical transducer including a germanium crystal provided with a base electrode, an emitter electrode and a collector electrode and means for varying the distance between the emitter and collector electrodes in response to acoustical signal variations in a predetermined manner, thereby to derive an output current which varies in accordance with the accoustical signal.

An electro-mechanical transducer in accordance with the present invention comprises a semi-conductor device provided with a base electrode, an emitter electrode and a collector electrode and wherein the distance between the emitter and collector electrodes is varied by the vibratile movement of an element which may be the diaphragm of a microphone or the stylus of a phonograph pick-up device, the element being carried by or connected with one of the electrodes of the device.

In a present preferred form of the invention, the germanium crystal is vibrated with respect to the emitter and collector electrodes which are in contact with inclined surfaces of the crystal. The two electrodes are provided with smooth tips and are mounted and arranged in such a manner that the tips roll or rock over the inclined contact surfaces when the crystal is vibrated by the vibratile element. With this arrangement, it has been found that the output current derived from the amplifier is effectively varied in accordance with an applied acoustical signal and may be further amplified before being reproduced.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic representation and circuit diagram of a transducer embodying the present invention;

Figure 2 is a view in perspective, with parts broken away, of a phonograph pick-up device, being a further embodiment of the invention;

Figures 3 to 5 are schematic top plan views of a portion of the pick-up device of Figure 2 illustrating various operating positions of the transducer element of the pick-up device;

Figure 6 is an end view of the transducer element and its electrodes taken in the direction of the arrow of Figure 3; and Figure 7 is a schematic circuit diagram showing the transducer of the present invention coupled to an audio frequency amplifier and a loud speaker.

Referring now to the drawing in which like components have been designated by the same reference numerals throughout the figures, and particularly to Figure 1, there is illustrated a transducer in accordance with the invention comprising a semi-conductor device. The semi-conductor device includes body 10 of semi-conducting material which may consist, for example, of boron, silicon, germanium, tellurium or selenium containing a small but sufficient number of atomic impurity centers or lattice imperfections as commonly employed for best results in crystal rectifiers. Germanium is the preferred material for body 10 and may be prepared so as to be an electronic N type semi-conductor as is well known. The surface of semi-conducting body 10 may be polished and etched in a conventional manner. It is also feasible to utilize a germanium block from a commercial high-back-voltage germanium rectifier such as the type 1N34 in which case further surface treatment may not be required.

Semi-conducting body 10 is provided with emitter electrode 11, collector electrode 12 and base electrode 13. Emitter electrode 11 and collector electrode 12 are usually small area electrodes and may be point contacts consisting, for example of tungsten or Phosphor bronze wires having a diameter of the order of 2 to 5 mils. The two electrodes 11 and 12 are normally spaced approximately two mils apart. Emitter electrode 11 and collector electrode 12 make rectifying, high resistance contacts with body 10. Since electrodes 11 and 12 are normally pressed against body 10 without being welded or otherwise fixed to body 10, they may be moved or rocked over the surface of body 10. Emitter and collector electrodes 11 and 12 are usually placed closely adjacent to each other on the same surface of body 10 or on opposite surfaces thereof in which case they may be separated by the thickness of the crystal which may amount to 2 to 5 mils. Base electrode 13 provides a low resistance, non-rectifying contact with the bulk material of semi-conducting body 10 and usually is a large area electrode. Thus, base electrode 13 is usually soldered or sweated on body 10 and hence is in fixed contact therewith.

A comparatively large reverse bias voltage is normally impressed between collector electrode 12 and base electrode 13. If it is assumed that body 10 consists of an N type crystal which is believed to have a P type surface layer, a negative potential should be impressed on collector electrode 12. To this end there may be provided battery 15 having its positive terminal grounded while its negative terminal is connected to collector electrode 12 through load resistor 16. Base electrode 13 may also be grounded as shown. A comparatively small forward bias voltage is provided between emitter electrode 11 and base electrode 13. Assuming again that body 10 consists of an N type crystal which is believed to have a P type surface layer, a positive potential should be impressed on emitter electrode 11. To this end there is provided bias battery 17 having its negative terminal grounded while its positive terminal is connected through resistor 18 to emitter electrode 11. The purpose of resistor 18 is to limit the current which is allowed to flow through emitter electrode 11. It may be pointed out that the required bias potential between emitter electrode 11 and base electrode 13 may also be provided by a bias network as is conventional.

An output signal may be derived from output terminals 20, one of which is grounded while the other one is coupled to collector electrode 12 through coupling capacitor 21. The circuit of Figure 1 as described herein will develop a constant current flowing through load resistor 16 so that no signal is developed at output terminals 20.

In accordance with the present invention one of the electrodes 11 or 12 is mechanically vibrated with respect to the other electrode. As will be pointed out hereinafter in connection with Figure 2 it is also feasible to vibrate body 10 or base electrode 13 which is fixed thereto, with respect to electrodes 11 and 12. Thus, a mechanically vibratile element such as the stylus of a phonograph pick-up device or the diaphragm of a microphone may be connected, for example, to emitter electrode 11 to rock it over the surface of semi-conducting body 10 as indicated by arrow 22. Preferably, the tip of emitter electrode 11 as well as that of collector electrode 12 is rounded as clearly shown in Figure 1 to facilitate the rocking or oscillating motion of one of the electrodes with respect to the other.

Since the current flowing through load resistor 16 is a function of the distance between electrodes 11 and 12 an output signal will be derived across load resistor 16 which may be obtained from output terminals 20. This output signal varies with the distance between emitter electrode 11 and collector electrode 12 which in turn is controlled by the vibratile element connected thereto.

It is also feasible to control the amplification of a device as shown in Figure 1. If an input signal is impressed across resistor 18, the amplitude of the output signal derived from terminals 20 may be varied by rocking, for example, electrode 12. This may be accomplished manually or by an electromagnetic solenoid attached to electrode 12. Thus, the gain of the amplifier 10 may be controlled in accordance with a signal such as an AVC voltage.

A preferred embodiment of the present invention is illustrated in Figure 2. Although Figure 2 shows a phonograph pick-up device embodying the present invention it is to be understood that the principles of the invention are also applicable to a transducer including a microphone. In the phonograph pick-up device of Figure 2 a phonograph stylus 41 is connected mechanically to crystal 10, thereby to vibrate it with respect to its emitter and collector electrodes 11, 12. For this purpose, crystal 10 is of wedge shape and has two inclined surfaces 24 and 25 as shown more clearly in Figures 3 to 6. Inclined surfaces 24, 25 may form an angle of 90 degrees or less. Surfaces 24, 25 are lapped, polished and acid etched as is conventional.

Emitter electrode 11 and collector electrode 12 consist of wires of a thickness of approximately two mils having loop shape intermediate portions as shown particularly in Figure 6 to provide a spring action. The free ends of emitter and collector electrodes 11 and 12 are soldered or otherwise secured to metallic rods 26, 27 which may be stiff wires. Rods 26, 27 extend through block 28 of a suitable insulating material such as bakelite. Rods 26, 27 are secured by screws 30, 31 which also hold lugs 32, 33. Thus, lugs 32, 33 are in an electric contact with rods 26, 27 respectively and wires or leads may be soldered thereto to complete an electric circuit.

Crystal 10 is soldered to screw 35 which is mounted in an internally threaded opening in an upright metallic arm 36. Accordingly, screw 35 represents the base electrode. Thus, the position of surfaces 24, 25 of crystal 10 may be adjusted by rotation of screw 35 which may be locked by lock nut 37.

Upright arm 36 is secured to or integral with hollow shaft 38 having a downwardly extending sleeve 40 for receiving a phonograph stylus 41. Stylus 41 is held by screw 42 having a knurled head 43, the screw cooperating with an internal thread in shaft 38. Shaft 38 is mounted in two bearings formed by an upper plate 44 which, as shown, may be integral with block 28 and by a metallic spring plate 45. Shaft 38 is encircled by two rubber sleeves 46 and 47 held between plates 44 and 45 and which serve as a damping means. Crystal 10 and stylus 41 extend through a suitable opening 48 in upper plate 44 and a corresponding opening is provided in spring plate 45 as well as in a lower or base plate 50.

Stylus 41 and crystal 10 are normally maintained in a center position by centering spring 51. As clearly shown in Figure 2, centering spring 51 consists of a stiff flexible wire secured between shaft 38 and bracket 52 which is fastened by screws 53 to upper plate 44. Spring 51 also tends to return stylus 41 and crystal 10 into their normal center position. A further damping means may be provided comprising a plate 54 which may consist of "Viscaloid" or any other suitable damping material and which is rigidly secured to shaft 38. The upper end of plate 54 may be secured by bracket 55 to an up-right 56 integral with or fastened to upper plate 44.

When the pickup device of Figure 2 rides over a record, stylus 41 is mechanically vibrated in the direction indicated by arrow 58. This will vibrate crystal 10 about its pivot which is represented by the axis of shaft 38. It will be noted that stylus 41, shaft 38 and electrodes 11, 12 are arranged substantially in a plane to prevent slippage of the electrodes. Stylus 41 is forced to vibrate against the action of spring 51 and mechanical damping is provided by rubber sleeves 46, 47 and by the "Viscaloid" plate 54. The relative movements of emitter and collector electrodes 11 and 12 with respect to crystal 10 are shown more clearly in Figures 3 to 5. Thus, Figure 4 illustrates the normal or center position which crystal 10 assumes with respect to electrodes 11 and 12 under the influence of spring 51. The distance between electrodes 11 and 12 in this position may amount, for example, to three mils. The stylus is diagrammatically represented at 41 and the pivotal axis at 38. Let it now be assumed that stylus 41 is moved in the direction of arrow 60 in Figure 3. Accordingly, crystal 10 moves toward the right and the distance between emitter and collector electrodes 11, 12 may be reduced, for example, to one mil. Electrodes 11, 12 are pressed into contact with crystal surfaces 24, 25 by the spring action of their intermediate loops. If stylus 41 moves in the direction of arrow 61 (Figure 5), crystal 10 will move to the left. Consequently, the distance between electrodes 11, 12 now increases and may amount, for example, to 5 mils.

It is to be understood that crystal 10 may also be vibrated by connecting it to the diaphragm of a microphone instead of connecting it to a phonograph stylus. The loop shape intermediate portion of electrodes 11 and 12 are clearly shown in Figure 6. The electrodes should be shaped in such a manner that they assert substantially equal pressure on body 10 in their various operating portions shown in Figures 3 to 5. The tips of electrodes 11 and 12 are rounded as clearly illustrated in Figures 3 to 5 to facilitate their rocking motion across surfaces 24 and 25.

Preferably, the transducer of the invention is prepared by pulsing electrodes 11 and 12 with an electric current of short duration after they have been assembled. Usually, it is only necessary to discharge, for example, a capacitor between collector electrode 12 and base electrode 13. In accordance with the present invention, this is preferably effected by pulsing the collector electrode 12 while stylus 41 rides on a record having recorded thereon with maximum amplitude a 500 or 1,000 cycle standard tone. In this manner the entire surface 25 over which collector electrode 12 rides during the normal operation of the transducer of the invention will be electrically treated.

As pointed out hereinbefore, connection may be made to electrodes 11, 12 through lugs 32 and 33. Connection to the base electrode 13 or screw 35 may be made through bracket 52 which is electrically connected to screw 35 by spring 51, shaft 38 and arm 36. Figure 7 illustrates by way of example a circuit diagram of the transducer of the invention connected to a vacuum tube audio frequency amplifier 66 and a loud speaker 75. Semi-conducting body 10 is again provided with base electrode 13 and with emitter electrode 11 and collector electrode 12. Arrow 62 indicates that crystal 10 may be mechanically vibrated as explained hereinabove. Base electrode 13 is grounded as shown while collector electrode 12 is connected to the negative terminal of battery 15 through load resistor 16. Emitter battery 17 has its negative terminal grounded. Potentiometer resistor 63 is connected across battery 17 and a predetermined voltage may be obtained from variable tap 64 connected to emitter electrode 11 through resistor 18.

In accordance with the above explanation a voltage is developed across load resistor 16 which varies with the distance between electrodes 11 and 12. This output voltage is coupled through capacitor 21 to control grid 65 of audio amplifier 69 which may be a pentode as shown. The cathode of audio amplifier 69 may be grounded as shown while the control grid 65 is grounded through grid leak resistor 66 connected to grid bias battery 67. The anode voltage supply is indicated by battery 70 connected to the plate of amplifier 69 through inductor 71. The screen grid of amplifier 66 is connected to battery 70 through dropping resistor 72 bypassed to ground by capacitor 73.

The audio signal is thus amplified by amplifier 69 and is impressed on inductor 74 which is magnetically coupled to inductor 71 and is then reproduced by loud speaker 75.

It is to be understood that amplification of the output signal derived from the transducer of the invention may not be necessary particularly if the audio signal is reproduced by headphones.

There has thus been disclosed a novel semiconductor transducer embodying a semi-conductor device of the transistor type. The output signal is a function of the distance between the emitter and collector electrodes which is varied by a vibratile element such as the stylus of a phonograph pickup or the diaphragm of a microphone.

What is claimed is:

1. An electro-mechanical device comprising a semi-conducting body, a first electrode having a low-resistance non-rectifying contact with said body, second and third electrodes, said second and third electrodes being spaced apart and each having a rectifying contact with said body, and means connected with said first electrode for moving said first electrode and said body with respect to said second and third electrodes thereby to vary the distance between said second and third electrodes without substantially changing the contact pressure between said second and third electrodes and said body.

2. An electro-mechanical device comprising a semi-conducting body, a first electrode having a low-resistance non-rectifying fixed contact with said body, a second and a third electrode, said second and third electrodes being spaced apart and each having a rectifying contact with said body, and vibratile means connected with said first electrode for moving said first electrode and said body with respect to said second and third electrodes thereby to vary the distance between said second and third electrodes without substantially changing the contact pressure between said second and third electrodes and said body.

3. An electro-mechanical transducer comprising a semi-conducting body, a base electrode in fixed contact with said body, collector and emitter electrodes, disposed in spaced apart relation with respect to each other and each having a movable contact with said body, and means in operative connection with said base electrode for moving said base electrode and said body with respect to said collector and emitter electrodes thereby to vary the distance between said collector and emitter electrodes without substantially changing the contact pressure between said collector and emitter electrodes and said body.

4. An electro-mechanical transducer comprising a semi-conducting body, a base electrode having a fixed contact with said body, an emitter and a collector electrode, said emitter and collector electrodes being disposed in spaced apart relation with respect to each other and each consisting of a filamentary conductor having a rounded tip in contact with said body, and vibratile means connected with said base electrode for moving said base electrode and said body with respect to said conductors and for rocking at least one of said conductors over said body without substantially changing the contact pressure between said collector and emitter electrodes and said body, thereby to vary the distance between said emitter and collector electrodes.

5. An electro-mechanical transducer comprising a semi-conducting body, a base electrode in fixed contact with said body, an emitter electrode and a collector electrode, said emitter and collector electrodes being disposed in spaced apart relation with respect to each other and in rectifying contact with said body, means for impressing a forward bias voltage between said emitter and base electrodes, means including a source of voltage for impressing a reverse bias voltage between said collector and base electrodes, an impedance element serially connected with said source between said collector and base electrodes, vibratile means carried by said base electrode for moving said base electrode and body with respect to said emitter and collector electrodes thereby to vary the distance between said emitted and collector electrodes, without substantially changing the contact pressure between said collector and emitter electrodes and said body and an output circuit connection across said impedance element for deriving an output signal which varies with said distance.

6. An electro-mechanical transducer comprising a semi-conducting body, a base electrode in fixed contact with said body, an emitter electrode and a collector electrode, said emitter and collector electrodes being disposed apart relation with respect to each other and also being in movable contact with said body, means for impressing a forward bias voltage between said emitter and base electrodes, means including a source of voltage for impressing a reverse bias voltage between said collector and base electrodes, an impedance element serially connected with said source between said collector and base electrodes, vibratile means operatively connected to said base electrode for moving said base electrode and said body with respect to said emitter and collector electrodes thereby to vary the distance between said emitter and collector electrodes, without substantially changing the contact pressure between said collector and emitter electrodes and said body and an output circuit connection across said impedance element for deriving an output signal which varies with said distance.

7. An electro-mechanical transducer comprising a semi-conducting body having two inclined surfaces, a base electrode in contact with said body, an emitter electrode in contact with one of said inclined surfaces, a collector electrode in contact with the other one of said inclined surfaces, and vibratile means said body including means for carrying said vibratile means, thereby to vary the distance between said emitter and collector electrodes in response to movement imparted to said vibratile means without substantially changing the contact pressure between said collector and emitter electrodes and said body.

8. An electro-mechanical transducer comprising a semi-conducting body having two inclined surfaces, a base electrode in fixed contact with said body, an emitter electrode in movable contact with one of said inclined surfaces, a collector electrode in movable contact with the other one of said inclined surfaces, and vibratile means, said base electrode including means for carrying said vibratile means to oscillate said body with respect to said emitter and collector electrodes in response to movement imparted to said vibratile means, without substantially changing the contact pressure between said collector and emitter electrodes and said body, thereby to vary the distance between said emitter and collector electrodes.

9. An electromechanical transducer comprising a semi-conducting body having two inclined surfaces, emitter and collector electrodes, each consisting of a filamentary conductor, a support having secured thereto one extremity of each of said conductors, the other extremity of each of said conductors having means whereby they are in movable contact with one of said inclined surfaces, each conductor having a flexible intermediate portion, means for pivotally supporting said body from said support, a movable element having means whereby it is mechanically secured to said body and adapted to vibrate said body about its pivot, thereby to move said body with respect to said emitter and collector electrodes and to vary the distance between said emitter and collector electrodes, and means attached between said body and said support for biasing said body to a normal centered position with respect to said emitter and collector electrodes.

10. An electro-mechanical transducer comprising a semi-conducting body having two angularly disposed surfaces, a base electrode in fixed contact with said body, emitter and collector electrodes, each consisting of a filamentary conductor, a support having secured thereto one extremity of each of said conductors, the other extremity of each of said conductors having means whereby they are in movable contact with one of said surfaces, each conductor having a resilient loop-shaped intermediate portion for pressing said emitter and collector electrodes against said surfaces, means for pivotally supporting said body from said support, a movable stylus element having means whereby it is mechanically secured to said body and adapted to vibrate said body about its pivot, thereby to move said body with respect to said emitter and collector electrodes and to vary the distance between said emitter and collector electrodes, a spring secured between said body and said support for urging said body and stylus element into a predetermined position, and means connected between said body and said support for damping the vibrations of said body and stylus element.

11. An electro-mechanical transducer comprising a semi-conducting body having at least two surfaces angularly disposed with respect to each other, a base electrode in fixed contact with said body, emitter and collector electrodes, each consisting of a fine wire, a support having secured thereto one extremity of each of said wires, the other extremity of each of said wires having means whereby they are in movable contact with one of said angularly disposed surfaces, each wire having a resilient loop-shaped intermediate portion, means for pivotally supporting said body from said support, a phonograph stylus having means whereby it is mechanically secured to said base electrode and adapted to vibrate said body about its pivot, thereby to move said body with respect to said emitter and collector electrodes and to vary the distance between said emitter and collector electrodes, a spring connected between said base elecrtode and said support urging said body and stylus into a normal position, and means provided between said base electrode and said support for damping the vibrations of said body and stylus.

12. An electro-mechanical transducer comprising a support, a semi-conducting body having two adjacent surfaces angularly disposed with respect to each other, said body having means whereby it is pivotally carried by said support and capable of vibrating about a predetermined pivotal axis, two flexible conductors, one end of each conductor having means whereby it is carried by said support, the other end of each conductor having means whereby it is in contact with an individual one of said adjacent surfaces, said conductors having each a resilient spring-like intermediate portion for pressing them against their respective surfaces, whereby the distance between said conductors varies in response to vibratile movement of said body, and a spring secured between said body and said support for resiliently holding said body in a predetermined position.

13. An electro-mechanical transducer comprising a support, a semi-conducting body having two adjacent surfaces angularly disposed with respect to each other, said body having means whereby it is pivotally carried by said support and capable of vibrating about a predetermined pivotal axis, said adjacent surfaces having means whereby they are disposed with respect to said pivotal axis so that their apex is capable of vibrating in an arc about said pivotal axis, two flexible thin wires, means whereby one end of each wire is carried by said support, the other end of each wire having a rounded tip in contact with an individual one of said adjacent surfaces, said wires having each a resilient loop-shape intermediate portion for urging them against their surfaces, whereby the distance between said tips varies in response to vibratile movement of said body, and a spring secured between said body and said support for resiliently holding said body in a predetermined position.

14. An electromechanical transducer comprising a support, a semi-conducting body having two adjacent surfaces angularly disposed with respect to each other, a large-area electrode in fixed contact with said body, said body having means whereby it is pivotally carried by said support and capable of vibrating about a predetermined pivotal axis, said adjacent surfaces being disposed with respect to said pivotal axis so that their apex is capable of vibrating along a circle about said pivotal axis, two thin wires, means whereby one end of each wire is carried by said support, the other end of each wire having a smooth rounded tip in contact with an individual one of said adjacent surfaces, said wires having each a resilient loop-shape intermediate portion for pressing said tips against their associated surfaces, whereby the distance between said wires varies in response to vibratile movement of said body, a spring secured between said electrode and said support for normally urging said body into a predetermined position and for biasing it against said vibratile movement, and means provided between said electrode and said support for damping said vibratile movement.

LESLIE J. ANDERSON.
ROBERT K. DUNCAN.

References Cited in the file of this patent

UNITED STATES PATENTS

| Number | Name | Date |
|---|---|---|
| 2,476,323 | Rack | July 19, 1949 |
| 2,497,770 | Hanson | Feb. 14, 1950 |
| 2,522,521 | Kock | Sept. 19, 1950 |
| 2,530,745 | Wallace | Nov. 21, 1950 |
| 2,549,550 | Wallace | Apr. 17, 1951 |